(12) United States Patent
Kwone et al.

(10) Patent No.: US 12,459,959 B2
(45) Date of Patent: Nov. 4, 2025

(54) INDIUM COMPOUND, METHOD OF PRODUCING THE SAME, COMPOSITION FOR DEPOSITING INDIUM-CONTAINING THIN FILM, AND INDIUM-CONTAINING THIN FILM

(71) Applicant: DNF CO., LTD., Daejeon (KR)

(72) Inventors: Yonghee Kwone, Daejeon (KR); Youngjae Im, Daejeon (KR); Sangyong Jeon, Daejeon (KR); Taeseok Byun, Daejeon (KR); Sangchan Lee, Daejeon (KR); Sangick Lee, Daejeon (KR)

(73) Assignee: DNF CO., LTD., Daejeon (KR)

( * ) Notice: Subject to any disclaimer, the term of this patent is extended or adjusted under 35 U.S.C. 154(b) by 103 days.

(21) Appl. No.: 18/146,939

(22) Filed: Dec. 27, 2022

(65) Prior Publication Data
US 2023/0212196 A1  Jul. 6, 2023

(30) Foreign Application Priority Data

Dec. 30, 2021  (KR) .................. 10-2021-0192107

(51) Int. Cl.
*C07F 5/00*  (2006.01)
*C23C 16/40*  (2006.01)
*C23C 16/455*  (2006.01)

(52) U.S. Cl.
CPC ............. *C07F 5/00* (2013.01); *C23C 16/407* (2013.01); *C23C 16/45553* (2013.01)

(58) Field of Classification Search
CPC .................................. C07F 5/00; C07F 17/00
See application file for complete search history.

(56) References Cited

FOREIGN PATENT DOCUMENTS

| KR | 10-2014-0059922 A | 5/2014 |
| KR | 10-2328782 B1 | 11/2021 |
| TW | 200302811 A | 8/2003 |
| TW | 202124396 A | 7/2021 |

OTHER PUBLICATIONS

P. Jutzi, et al., 460(2) Journal of organometallic chemistry C13-C15 (1993) (Year: 1993).*
H. Saeidian, 31 Structural Chemistry 851-859 (2020)("Saeidian") (Year: 2020).*
Google Translation—Jutzi (Year: 2025).*
Jutzi et al., "(Dimethylaminoethyl)cyclopentadienyl-Liganden in der Chemie von Gruppe-13-Elementen (Al, Ga, In)" Journal of Organometallic Chemistry, vol. 460, No. 2, Nov. 16, 1993, pp. C13-C15.
Elschenbroich, C. (n.d.). In *Organometallics* (3rd ed.) Section 7.3. Gallium, Indium, and Thallium Organyls, Mar. 2006, p. 126, Wiley-VCH., Germany, ISBN: 978-3-527-29390.
Office Action in Taiwanese Application No. TW 111147164 dated Nov. 2, 2023 in 7 pages.
Office Report of the corresponding Chinese Application No. 111147164, dated Jun. 14, 2023.
Jutzi et al., "(Dimethylaminoethyl)cyclopentadienyl Ligands in Compounds of s- and p-Block Elements" Coordination Chemistry Reviews, vol. 137, pp. 179-199 (1994).
Peng et al. "X-ray Photoelectron Spectroscopy Study of Indium Tin Oxide Films Deposited at Various Oxygen Partial Pressures" Journal of Electronic Materials, vol. 46, 1405-1412 (Nov. 28, 2016).

* cited by examiner

*Primary Examiner* — Alexander R Pagano
*Assistant Examiner* — Frank S. Hou
(74) *Attorney, Agent, or Firm* — Knobbe, Martens, Olson & Bear, LLP (57) ABSTRACT

Provided are an indium compound, a method of producing the same, a composition for depositing an indium-containing thin film including the same, and a method of producing an indium-containing thin film using the same. The provided indium compound has excellent thermal stability, high volatility, and improved vapor pressure, thereby producing an indium-containing thin film having a uniform thickness with an improved deposition speed by adopting the indium compound.

12 Claims, 2 Drawing Sheets

INDIUM COMPOUND, METHOD OF PRODUCING THE SAME, COMPOSITION FOR DEPOSITING INDIUM-CONTAINING THIN FILM, AND INDIUM-CONTAINING THIN FILM

CROSS-REFERENCE TO RELATED APPLICATIONS

This application claims priority under 35 U.S.C. § 119 to Korean Patent Application No. 10-2021-0192107, filed on Dec. 30, 2021, in the Korean Intellectual Property Office, the disclosure of which is incorporated herein by reference in its entirety.

TECHNICAL FIELD

The following disclosure relates to an indium compound, a method of producing the same, a composition for depositing a thin film including the same, a method of producing an indium-containing thin film, and an indium-containing thin film.

BACKGROUND

A next-generation display is being developed with a goal of low power, high resolution, and high reliability. In order to achieve the goal, a thin film transistor (TFT) material having high charge mobility is required.

A thin film is variously used in important applications such as nanotechnology and manufacture of a semiconductor device. The applications as such include, for example, a conductive film, high-refractive index optical coating, anti-corrosion coating, photocatalytic self-cleaning glass coating, biocompatible coating, gate dielectric insulating film, a dielectric capacitor layer, a capacitor electrode, a gate electrode, an adhesive diffusion barrier, and an integrated circuit in a field effect transistor (FET), and the like. In addition, the thin film is also used in microelectronic applications such as a high-K dielectric oxide for a dynamic random access memory (DRAM) application, an infrared detector, and ferroelectric perovskite used in non-volatile ferroelectric random access memories (NV-FeFAMs). The need to use the dielectric thin film as such is increased due to continuous miniaturization of microelectronic engineering components.

Amorphous silicon was used in the thin film transistors, but in recent years, a metal oxide which has higher charge mobility than silicon and is easily processed at low temperature as compared with polycrystalline silicon is being used. The metal oxides include materials to which various kinds of metal elements such as indium and zinc are added, and a metal oxide thin film is produced by a process such as sputtering, atomic layer deposition (ALD), pulsed laser deposition (PLD), and chemical vapor deposition (CVD).

Korean Patent Registration Publication No. 10-2328782 (Mar. 6, 2017) and Korean Patent Registration Publication No. 10-1953893 (Nov. 8, 2012) disclose the related technology. The disclosure of this section is to provide background information relating to the present disclosure. Applicant does not admit that any information contained in this section constitutes prior art.

SUMMARY

An embodiment of the present disclosure is directed to providing a novel indium compound and a method of producing an indium compound for easy mass production.

Another embodiment of the present disclosure is directed to providing a composition for depositing an indium-containing thin film including the indium compound according to an embodiment of the present disclosure.

Another embodiment of the present disclosure is directed to providing a method of producing an indium-containing thin film showing a uniform thickness, by using an indium compound or a composition for depositing an indium-containing thin film including the same.

Still another embodiment of the present disclosure is directed to providing an indium-containing thin film having an indium content of 35% or more.

In one general aspect, an indium compound represented by the following Chemical Formula 1 is provided:

[Chemical Formula 1]

wherein
L is C1-C10 alkylene or haloC1-C10 alkylene;
$R_1$ to $R_4$ are independently of one another hydrogen or C1-C10 alkyl;
$R_5$ and $R_6$ are independently of each other C1-C10 alkyl;
Y is $-NR_{11}R_{12}$, $-OR_{13}$, or $-SR_{14}$; and
$R_{11}$ to $R_{14}$ are independently of one another hydrogen, C1-C10 alkyl, or haloC1-C10 alkyl, or $R_{11}$ and $R_{12}$ may be linked to form a ring.

In Chemical Formula 1, L may be C1-C6 alkylene, $R_1$ to $R_4$ may be independently of one another hydrogen or C1-C6 alkyl, $R_5$ and $R_6$ may be independently of each other C1-C6 alkyl, Y may be $-NR_{11}R_{12}$, $-OR_{13}$, or $-SR_{14}$, and $R_{11}$ to $R_{14}$ may be independently of one another hydrogen or C1-C6 alkyl, or $R_{11}$ and $R_{12}$ may be linked to form an alicyclic ring.

The indium compound according to an embodiment of the present disclosure may be represented by the following Chemical Formula 2:

[Chemical Formula 2]

wherein
$R_1$ to $R_4$ are independently of one another hydrogen or C1-C6 alkyl;
$R_5$ and $R_6$ are independently of each other C1-C6 alkyl;
Y is $-NR_{11}R_{12}$, $-OR_{13}$, or $-SR_{14}$;
$R_{11}$ to $R_{14}$ are independently of one another hydrogen or C1-C6 alkyl, or $R_{11}$ and $R_{12}$ may be linked to form an alicyclic ring; and
m is an integer of 1 to 3.

The indium compound according to an embodiment of the present disclosure may be selected from the following compounds:

[Chemical Formula 1]

[Chemical Formula 4]

R₅MgX¹ [Chemical Formula 5]

R₆MgX² [Chemical Formula 6]

In another general aspect, a method of producing an indium compound includes: reacting a compound of the following Chemical Formula 4 with a compound of the following Chemical Formula 5 and a compound of the following Chemical Formula 6 to produce an indium compound represented by the following Chemical Formula 1:

wherein

L is C1-C10 alkylene or haloC1-C10 alkylene;

$R_1$ to $R_4$ are independently of one another hydrogen or C1-C10 alkyl;

$R_5$ and $R_6$ are independently of each other C1-C10 alkyl;

Y is —$NR_{11}R_{12}$, —$OR_{13}$, or —$SR_{14}$;

$R_{11}$ to $R_{14}$ are independently of one another hydrogen, C1-C10 alkyl, or haloC1-C10 alkyl, or $R_{11}$ and $R_{12}$ may be linked to form a ring; and X, X¹, and X² are independently of one another a halogen.

The compound of Chemical Formula 4 may be produced by reacting a compound of Chemical Formula 7 and a compound of Chemical Formula 8:

[Chemical Formula 7]

InX₃ [Chemical Formula 8]

wherein

L is C1-C10 alkylene or haloC1-C10 alkylene;

$R_1$ to $R_4$ are independently of one another hydrogen or C1-C10 alkyl;

Y is —$NR_{11}R_{12}$, —$OR_{13}$, or —$SR_{14}$;

$R_{11}$ to $R_{14}$ are independently of one another hydrogen, C1-C10 alkyl, or haloC1-C10 alkyl, or $R_{11}$ and $R_{12}$ may be linked to form a ring; and X is a halogen.

In another general aspect, a composition for depositing an indium-containing thin film includes an indium compound represented by the following Chemical Formula 1:

[Chemical Formula 1]

wherein
L is C1-C10 alkylene or haloC1-C10 alkylene;
$R_1$ to $R_4$ are independently of one another hydrogen or C1-C10 alkyl;
$R_5$ and $R_6$ are independently of each other C1-C10 alkyl;
Y is $-NR_{11}R_{12}$, $-OR_{13}$, or $-SR_{14}$; and
$R_{11}$ to $R_{14}$ are independently of one another hydrogen, C1-C10 alkyl, or haloC1-C10 alkyl, or $R_{11}$ and $R_{12}$ may be linked to form a ring.

In Chemical Formula 1, L may be C1-C6 alkylene, $R_1$ to $R_4$ may be independently of one another hydrogen or C1-C6 alkyl, $R_5$ and $R_6$ may be independently of each other C1-C6 alkyl, Y may be $-NR_{11}R_{12}$, $-OR_{13}$, or $-SR_{14}$, and $R_{11}$ to $R_{14}$ may be independently of one another hydrogen or C1-C6 alkyl, or $R_{11}$ and $R_{12}$ may be linked to form an alicyclic ring.

The indium compound according to an embodiment of the present disclosure may be represented by the following Chemical Formula 2:

[Chemical Formula 2]

wherein
$R_1$ to $R_4$ are independently of one another hydrogen or C1-C6 alkyl;
$R_5$ and $R_6$ are independently of each other C1-C6 alkyl;
Y is $-NR_{11}R_{12}$, $-OR_{13}$, or $-SR_{14}$; and
$R_{11}$ to $R_{14}$ are independently of one another hydrogen or C1-C6 alkyl, or $R_{11}$ and $R_{12}$ may be linked to form an alicyclic ring; and
m is an integer of 1 to 3.

The indium compound according to an embodiment of the present disclosure may be selected from the following compounds:

In another general aspect, a method of producing an indium-containing thin film by using the indium compound according to an embodiment of the present disclosure or a composition for depositing an indium-containing thin film including the same is provided.

The production method may include: a) heating a substrate mounted in a chamber; and b) injecting a reaction gas and the composition for depositing an indium-containing thin film into the chamber to produce the indium-containing thin film.

The reaction gas may be any one or two or more selected from oxygen ($O_2$), ozone ($O_3$), vapor ($H_2O$), hydrogen peroxide ($H_2O_2$), nitrogen monoxide (NO), nitrous oxide ($N_2O$), nitrogen dioxide ($NO_2$), ammonia ($NH_3$), nitrogen ($N_2$), hydrazine ($N_2H_4$), amine, diamine, carbon monoxide (CO), carbon dioxide ($CO_2$), $C_1$ to C12 saturated or unsaturated hydrocarbon, hydrogen ($H_2$), argon (Ar), silane, and helium (He).

In still another general aspect, an indium-containing thin film includes 35% or more of indium.

Other features and aspects will be apparent from the following detailed description, the drawings, and the claims.

DETAILED DESCRIPTION OF EMBODIMENTS

Indium has excellent transparency and electrical conductivity and is widely used in a transparent electrode, and when a metal thin film including indium is formed by sputtering using a sputter target, the composition of a thin film deposited is determined by the sputter target, and thus, there are limitations to uniformly adjusting the composition of the thin film. In addition, since it is hard to uniformly maintain the composition and the thickness of the thin film in large area deposition, there is a difficulty in obtaining uniform film properties. In addition, when the thin film is produced by chemical vapor deposition (CVD) instead of sputtering, indium precursors such as trimethyl indium (CAS NO. 3385-78-2) that are mostly solid are used, and thus, there may be difficulties in vapor pressure adjustment and uniform film reproducibility. In particular, since most of the indium (In) precursor is thermally decomposed under high temperature conditions of 250° C. or higher, it is difficult to obtain a high-quality thin film, and there are limitations to obtaining a thin film having a uniform thickness and a constant multicomponent composition in large area deposition.

Therefore, there is needed to develop a high-quality indium precursor which has excellent thermal stability to high temperature and is uniformly deposited.

The present disclosure provides an indium compound, a method of producing the same, a composition for depositing an indium-containing thin film including the same, and a method of producing a thin film using the same.

The singular form used in the present Inventive steel may be intended to also include a plural form, unless otherwise indicated in the context.

The term "comprise" described in the present disclosure is an open-ended description having a meaning equivalent to the term such as "is/are provided", "contain", "have", or "is/are characterized", and does not exclude elements, materials or processes which are not further listed.

The term "alkyl" described in the present disclosure includes both a linear chain form and a branched chain form, and may have 1 to 10 carbon atoms, in one embodiment, 1 to 7 carbon atoms. In addition, alkyl in another embodiment may have 1 to 4 carbon atoms.

The term "alkylene" described in the present disclosure refers to a divalent organic radical derived by removing one hydrogen, wherein alkyl is as defined above.

The term "halo" or "halogen" described in the present disclosure refers to fluorine, chlorine, bromine, or iodine.

The term "haloalkyl" described in the present disclosure refers to an alkyl group in which one or more hydrogen atoms are substituted with a halogen atom, respectively. For example, the haloalkyl includes —$CF_3$, —$CHF_2$, —$CH_2F$, —$CBr_3$, —$CHBr_2$, —$CH_2Br$, —$CCl_3$, —$CHCl_2$, —$CH_2Cl$, —$CI_3$, —$CHI_2$, —$CH_2I$, —$CH_2$—$CF_3$, —$CH_2$—$CHF_2$, —$CH_2$—$CH_2F$, —$CH_2$—$CBr_3$, —$CH_2$—$CHBr_2$, —$CH_2$—$CH_2Br$, —$CH_2$—$CCl_3$, —$CH_2$—$CHCl_2$, —$CH_2$—$CH_2Cl$, —$CH_2$—$CI_3$, —$CH_2$—$CHI_2$, —$CH_2$—$CH_2I$, and the like, wherein alkyl and halogen are as defined above.

The number of carbons described in alkyl and the like in the present disclosure does not include the number of carbons of substituents, and as an example, C1-C10 alkyl refers to alkyl having 1 to 10 carbon atoms, which does not include the number of carbons of the substituents of the alkyl.

The term "substituted" described in the present disclosure refers to a hydrogen atom of a substituted part (for example, alkyl, aryl, or cycloalkyl) being replaced with a substituent.

Hereinafter, the present disclosure will be described in detail. Here, technical terms and scientific terms used in the present specification have the general meaning understood by a person skilled in the art unless otherwise defined, and a description for the known function and configuration obscuring the present disclosure will be omitted in the following description.

The present disclosure provides an indium compound represented by the following Chemical Formula 1:

[Chemical Formula 1]

wherein

L is C1-C10 alkylene or haloC1-C10 alkylene;

$R_1$ to $R_4$ are independently of one another hydrogen or C1-C10 alkyl;

$R_5$ and $R_6$ are independently of each other C1-C10 alkyl;

Y is —$NR_{11}R_{12}$, —$OR_{13}$, or —$SR_{14}$; and

$R_{11}$ to $R_{14}$ are independently of one another hydrogen, C1-C10 alkyl, or haloC1-C10 alkyl, or $R_{11}$ and $R_{12}$ may be linked to form a ring.

The indium compound represented by Chemical Formula 1 according to the present disclosure shows excellent thermal stability, high volatility, and improved vapor pressure, and thus, when adopted, an indium-containing thin film having high reliability may be obtained.

In Chemical Formula 1 of the indium compound according to an embodiment of the present disclosure, L may be C1-C6 alkylene, $R_1$ to $R_4$ may be independently of one another hydrogen or C1-C6 alkyl, $R_5$ and $R_6$ may be independently of each other C1-C6 alkyl, Y may be —$NR_{11}R_{12}$, —$OR_{13}$, or —$SR_{14}$, and $R_{11}$ to $R_{14}$ may be independently of one another hydrogen or C1-C6 alkyl, or $R_{11}$ and $R_{12}$ may be linked to form an alicyclic ring.

In one embodiment, an indium compound according to an embodiment may be represented by the following Chemical Formula 2:

[Chemical Formula 2]

wherein $R_1$ to $R_4$ are independently of one another hydrogen or C1-C6 alkyl;

$R_5$ and $R_6$ are independently of each other C1-C6 alkyl;

Y is $-NR_{11}R_{12}$, $-OR_{13}$, or $-SR_{14}$; and

$R_{11}$ to $R_{14}$ are independently of one another hydrogen or C1-C6 alkyl, or $R_{11}$ and $R_{12}$ may be linked to form an alicyclic ring; and m is an integer of 1 to 3.

In the indium compound represented by Chemical Formula 2, more specifically, $R_1$ to $R_4$ may be independently of one another hydrogen or C1-C4 alkyl, $R_5$ and $R_6$ may be independently of each other C1-C4 alkyl, Y may be $-NR_{11}R_{12}$, $-OR_{13}$, or $-SR_{14}$, and $R_{11}$ to $R_{14}$ may be independently of one another hydrogen or C1-C4 alkyl, or $R_{11}$ and $R_{12}$ may be linked to form a ring, and m may be in integer of 2 or 3.

In another embodiment, an indium compound according to an embodiment may be represented by the following Chemical Formula 2-1:

[Chemical Formula 2-1]

wherein

R is C1-C4 alkyl;

$R_1$ to $R_4$ are independently of one another hydrogen or C1-C4 alkyl;

Y is $-NR_{11}R_{12}$, $-OR_{13}$, or $-SR_{14}$;

$R_{11}$ to $R_{14}$ are independently of one another hydrogen or C1-C4 alkyl, or $R_{11}$ and $R_{12}$ may be linked with C2-C6 alkylene to form an alicyclic ring; and m is an integer of 2 or 3.

In an embodiment, the indium compound may be selected from the compounds of the following structures, but is not limited thereto:

The present disclosure provides a method of producing the indium compound according to an embodiment of the present disclosure, and the indium compound represented by the following Chemical Formula 1 may be produced by reacting a compound of the following Chemical Formula 4 with a compound of the following Chemical Formula 5 and a compound of the following Chemical Formula 6:

[Chemical Formula 1]

[Chemical Formula 4]

[Chemical Formula 5]

[Chemical Formula 6]

wherein

L is C1-C10 alkylene or haloC1-C10 alkylene;

$R_1$ to $R_4$ are independently of one another hydrogen or C1-C10 alkyl;

$R_5$ and $R_6$ are independently of each other C1-C10 alkyl;

Y is —$NR_{11}R_{12}$, —$OR_{13}$, or —$SR_{14}$;

$R_{11}$ to $R_{14}$ are independently of one another hydrogen, C1-C10 alkyl, or haloC1-C10 alkyl, or $R_{11}$ and $R_{12}$ may be linked to form a ring; and X, $X^1$, and $X^2$ are independently of one another a halogen.

Specifically, in the method of producing an indium compound according to an embodiment of the present disclosure, the indium compound represented by the following Chemical Formula 1 is produced by reacting the compound of Chemical Formula 4 with the compound of Chemical Formula 5 and the compound of Chemical Formula 6, in which the production may be performed by slowly adding the compound of Chemical Formula 5 and the compound of Chemical Formula 6, or by adding the compound of Chemical Formula 5, performing the reaction for a certain time, adding the compound of Chemical Formula 6, and then performing the reaction.

The compound of Chemical Formula 4 may be produced by reacting a compound of Chemical Formula 7 and a compound of Chemical Formula 8:

[Chemical Formula 7]

[Chemical Formula 8]

wherein

L is C1-C10 alkylene or haloC1-C10 alkylene;

$R_1$ to $R_4$ are independently of one another hydrogen or C1-C10 alkyl;

Y is —$NR_{11}R_{12}$, —$OR_{13}$, or —$SR_{14}$;

$R_{11}$ to $R_{14}$ are independently of one another hydrogen, C1-C10 alkyl, or haloC1-C10 alkyl, or $R_{11}$ and $R_{12}$ may be linked to form a ring; and X is a halogen.

In addition, the compound represented by Chemical Formula 7 may be produced by reacting alkyllithium and a compound of the following Chemical Formula 9:

[Chemical Formula 9]

wherein

L is C1-C10 alkylene or haloC1-C10 alkylene;

$R_1$ to $R_4$ are independently of one another hydrogen or C1-C10 alkyl;

Y is —$NR_{11}R_{12}$, —$OR_{13}$, or —$SR_{14}$; and $R_{11}$ to $R_{14}$ are independently of one another hydrogen, C1-C10 alkyl, or haloC1-C10 alkyl, or $R_{11}$ and $R_{12}$ may be linked to form a ring.

Specifically, the alkyllithium may be C1-C10 alkyllithium, and may be one or two or more selected from methyllithium, n-butyllithium, sec-butyllithium, tert-butyllithium, and n-hexyllithium, but is not limited thereto.

The method of producing an indium compound allows mass production by a simple process.

A solvent used in the production method according to an embodiment may be any common organic solvent, but in one embodiment, may be one or two or more selected from the group consisting of hexane, pentane, dichloromethane (DCM), dichloroethane (DCE), benzene, toluene, acetonitrile (MeCN), nitromethane, tetrahydrofuran (THF), N,N-dimethyl formamide (DMF), and N,N-dimethylacetamide (DMA).

A reaction temperature may be a temperature used in common organic synthesis, but may vary depending on the amounts of reaction materials and starting materials, and may be in one embodiment, −30° C. to 40° C., in another embodiment, −20° C. to 30° C., and in a further embodiment, −10° C. to 20° C.

The reaction is completed after confirming that the starting materials are completely consumed by NMR or the like. Thereafter, an extraction process, a process of distilling the solvent under reduced pressure, or a process of separating and purifying a target by a common method such as tube chromatography may be performed.

The cyclopentadiene-based compound is stably coordinated to a center metal by a resonance structure, so that the thermal stability of the indium compound may be much improved. Accordingly, the indium compound according to an embodiment of the present disclosure may be adopted to form a thin film formed of indium, an indium nitride ($InN_x$) or an indium oxide ($InO_x$) with high reliability.

Aminoalkyl, alkoxyalkyl, or alkylsulfide may be bonded to the cyclopentadiene-based compound. Accordingly, the thermal stability of the cyclopentadiene-based compound may be further improved during a deposition process.

The present disclosure provides a composition for depositing an indium-containing thin film including an indium compound represented by the following Chemical Formula 1:

[Chemical Formula 1]

wherein
L is C1-C10 alkylene or haloC1-C10 alkylene;
$R_1$ to $R_4$ are independently of one another hydrogen or C1-C10 alkyl;
$R_5$ and $R_6$ are independently of each other C1-C10 alkyl;
Y is $-NR_{11}R_{12}$, $-OR_{13}$, or $-SR_{14}$; and
$R_{11}$ to $R_{14}$ are independently of one another hydrogen, C1-C10 alkyl, or haloC1-C10 alkyl, or $R_{11}$ and $R_{12}$ may be linked to form a ring.

In Chemical Formula 1, L may be C1-C6 alkylene, $R_1$ to $R_4$ may be independently of one another hydrogen or C1-C6 alkyl, $R_5$ and $R_6$ may be independently of each other C1-C6 alkyl, Y may be $-NR_{11}R_{12}$, $-OR_{13}$, or $-SR_{14}$, $R_{11}$ to $R_{14}$ may be independently of one another hydrogen or C1-C6 alkyl, or $R_{11}$ and $R_{12}$ may be linked to form an alicyclic ring.

The indium compound according to an embodiment of the present disclosure may be represented by the following Chemical Formula 2:

[Chemical Formula 2]

wherein
$R_1$ to $R_4$ are independently of one another hydrogen or C1-C6 alkyl;
$R_5$ and $R_6$ are independently of each other C1-C6 alkyl;
Y is $-NR_{11}R_{12}$, $-OR_{13}$, or $-SR_{14}$;
$R_{11}$ to $R_{14}$ are independently of one another hydrogen or C1-C6 alkyl, or $R_{11}$ and $R_{12}$ may be linked to form an alicyclic ring; and
m is an integer of 1 to 3.

The indium compound according to an embodiment of the present disclosure may be selected from the following compounds:

In addition, the present disclosure provides a method of producing an indium-containing thin film by using the indium compound according to an embodiment of the present disclosure or a composition for depositing an indium-containing thin film including the same.

The method of producing an indium-containing thin film may be a common method used in the art, specifically, atomic layer deposition (ALD), chemical vapor deposition (CVD), metal-organic chemical vapor deposition (MOCVD), low pressure chemical vapor deposition (LPCVD), plasma enhanced chemical vapor deposition (PECVD), or plasma enhanced atomic layer deposition (PEALD).

In embodiments, the method of producing an indium-containing thin film according to an embodiment may be atomic layer deposition (ALD), chemical vapor deposition (CVD), metal-organic chemical vapor deposition (MOCVD), or the like.

The production method may include: a) heating a substrate mounted in a chamber; and b) injecting a reaction gas and the composition for depositing an indium-containing thin film into the chamber to produce an indium-containing thin film.

In an embodiment according to the present disclosure, the substrate mounted in a chamber in step a) may be heated to 200° C. to 1000° C., specifically 250° C. to 500° C., and more specifically 300° C. to 400° C. The composition for depositing an indium-containing thin film may be deposited at a relatively low temperature like the above temperature, process efficiency is improved, and the thermal decomposition of the compounds used in the deposition process is decreased, thereby greatly improving the stability and the productivity of the deposition process. In addition, the content of impurities such as carbon in the indium-containing thin film may be decreased to improve the physical properties of the produced thin film.

The substrate according to an embodiment may include one or two or more substrates selected from the group consisting of glass, silicon, metal, polyester (PE), polyethylene terephthalate (PET), polyethylene naphthalate (PEN), polycarbonate (PC), polyetherimide (PEI), polyethersulfone (PES), polyetheretherketone (PEEK), and polyimide (PI), but is not limited thereto.

In step b), the composition for depositing an indium-containing thin film may be used alone, or in combination with one or a mixture of two or more selected from the group consisting of a gallium precursor and a zinc precursor.

Specifically, the gallium precursor may be trimethylgallium (TMG), and the zinc precursor may be diethylzinc (DEZ), but these are not limited thereto.

The method of producing an indium-containing thin film according to an embodiment of the present disclosure may produce a multilayer thin film including a dissimilar metal, and the indium-containing thin film may have a structure laminated by depositing the composition for depositing an indium-containing thin film and a precursor of other metals sequentially.

In addition, the multilayer thin film may be formed by mixing and depositing the composition for depositing an indium-containing thin film and the precursor of other metals, and specifically, may be laminated by depositing a compound in which one or two or more selected from the group consisting of a gallium precursor and a zinc precursor and the composition for depositing an indium thin film are mixed on a substrate.

More specifically, the multilayer thin film may be IGZO (indium/gallium/zinc/oxide), and a composition ratio of indium:gallium:zinc may be (1 to 10):(1 to 10):(1 to 10), in one embodiment, (1 to 5):(1 to 5):(1 to 5), and in another embodiment, 1:1:1.

In step b) of the production method, the deposition conditions may be adjusted depending on the structure or the thermal properties of the thin film to be desired, and an example of the deposition conditions according to an embodiment may include an input flow rate of the indium compound, an input flow rate of a reaction gas and a transport gas, pressure, RF power, and the like.

A non-limiting example of the deposition conditions may be adjusted to the ranges of an input flow rate of the indium compound of 1 to 1000 sccm as a Bubbler type, an input flow rate of the transport gas of 1 to 5000 sccm, the flow rate of the reaction gas of 10 to 5000 sccm, the pressure of 0.1 to 10 torr, and the RF power of 10 to 1000 W, but the present disclosure is not limited thereto.

An injection time of the composition for depositing an indium-containing thin film in step b) of the production method may be 1 to 30 seconds, in one embodiment, 1 to 20 seconds, and in another embodiment, 2 to 10 seconds, and within the range, the uniformity of the thin film thickness is improved, so that a uniform thin film may be produced even on a substrate having a complicated shape.

In an embodiment, the reaction gas may be any one or two or more selected from oxygen ($O_2$), ozone ($O_3$), vapor ($H_2O$), hydrogen peroxide ($H_2O_2$), nitrogen monoxide (NO), nitrous oxide ($N_2O$), nitrogen dioxide ($NO_2$), ammonia ($NH_3$), nitrogen ($N_2$), hydrazine ($N_2H_4$), amine, diamine, carbon monoxide (CO), carbon dioxide ($CO_2$), $C_1$ to $C_{12}$ saturated or unsaturated hydrocarbon, hydrogen ($H_2$), argon (Ar), silane, and helium (He).

Specifically, the reaction gas may be any one or two or more selected from vapor ($H_2O$), oxygen ($O_2$), ozone ($O_3$), hydrogen ($H_2$), silane, ammonia ($NH_3$), and hydrazine ($N_2H_4$), and when the deposition is performed in the presence of an oxidative reaction gas such as vapor ($H_2O$), oxygen ($O_2$), and ozone ($O_3$), an indium oxide ($InO_x$) thin film may be formed, when the deposition is performed in the presence of a reaction gas such as hydrogen ($H_2$) and silane, an indium-containing thin film is formed, and when the deposition is performed in the presence of a nitrogen-based reaction gas such as ammonia ($NH_3$) and hydrazine ($N_2H_4$), an indium nitride ($InN_x$) thin film may be formed.

In an embodiment, in the step of depositing, the transport gas is inert gas, and may be any one or two or more selected from argon (Ar), helium (He), and nitrogen ($N_2$), and specifically may be nitrogen ($N_2$), but is not limited thereto.

The production method according to an embodiment of the present disclosure may further include c) injecting the reaction gas into a chamber after step b), and cycles may be repeated with steps b) and c) as one cycle.

In an embodiment, after the transport gas and the composition for depositing an indium-containing thin film are injected into the chamber, a purge step of removing the composition for depositing an indium-containing thin film which is not adsorbed on the substrate using the transport gas may be performed.

In an embodiment, after the reaction gas is injected into the chamber, a purge step of removing reaction by-products and remaining reaction gas using the transport gas may be performed.

In an embodiment, cycles may be repeated until a thin film having a desired thickness is formed with the injection step of the composition for depositing an indium-containing thin film, the purge step, the injection step of a reaction gas, and the purge step as one cycle, and the cycle may be repeated specifically 50 to 1000 times, and more specifically 100 to 300 times. In this case, the thickness of the thin film may be appropriately implemented, and process efficiency may be improved.

The thin film produced by the method of producing an indium-containing thin film according to an embodiment of the present disclosure is uniform and shows an improved deposition speed, and thus, may provide a uniform conformal step coverage for a structure having a large aspect ratio.

The indium-containing thin film may have a specific resistance value at 25° C. of $1\times10^{-5}$ to $1\times10^{-1}$ Ωcm, in one embodiment, $1\times10^{-4}$ to $1\times10^{-2}$ Ωcm, and in another embodiment, $1\times10^{-3}$ to $5\times10^{-3}$ Ωcm.

The method of measuring the specific resistance value in the present disclosure is not particularly limited as long as it is a known measurement method commonly practiced in the art to which the present disclosure pertains, and as a specific example, may be a 4-probe method (4-probe measurement method).

The indium-containing thin film according to the present disclosure may have an indium content of 35% or more, in one embodiment, 35% to 65%, and in another embodiment, 35% to 50%.

Hereinafter, the method of producing an indium compound and the method of producing a thin film adopting the same according to the present disclosure will be described in more detail by the specific examples.

However, the following examples are only a reference for describing the present disclosure in detail, and the present disclosure is not limited thereto and may be implemented in various forms. In addition, the terms used herein are only for effectively describing certain examples, and are not intended to limit the present disclosure.

In addition, otherwise noted, all examples were performed using technologies for handling air-sensitive materials commonly known in the art, under an inert atmosphere, for example, purified nitrogen ($N_2$) or argon (Ar).

[Example 1] Production of $(C_5H_4(CH_2CH_2N(CH_3)_2))In(CH_3)_2$ n-Butyllithium (59 ml, 2.3 M solution in n-hexane, 0.14 mol) was added to a 1 L 2-neck flask including a magnetic stirrer and a condenser, 200 mL of n-hexane was added, and then stirring was performed.

(2-Dimethylaminoethyl)cyclopentadiene was slowly added while the internal temperature of the mixture was maintained at 0° C., and stirring was performed at room temperature for 2 hours to synthesize Li(2-dimethylaminoethyl)cyclopentadiene.

$InCl_3$ (30 g, 0.14 mol) was added to a 2 L 2-neck flask including a magnetic stirrer and a condenser, 200 ml of n-hexane was added thereto, and stirring was performed while the internal temperature was maintained at 0° C. Prepared Li(2-Dimethylaminoethyl)cyclopentadiene was slowly added to the flask, and stirring was performed at room temperature for 2 hours to synthesize $(C_5H_4(CH_2CH_2N(CH_3)_2))_2In(C_1)_2$.

MeMgCl (90 ml, 3.0 M solution in THF, 0.27 mol) was slowly added to the flask while the internal temperature was maintained at 10° C., and then production of light gray precipitate was confirmed. The synthesized mixture was filtered with a filtration device, the solvent was removed under reduced pressure, and 34 g (85% from $InCl_3$) of a light yellow liquid was obtained.

$^1$H NMR (400 MHz, C6D6) δ6.5, 5.6, 1.7(m, 4H, Cp), 2.5(t, 2H), 1.8(t, 2H), 1.5(s, 6H), −0.1(s, 6H)

Figure 1:
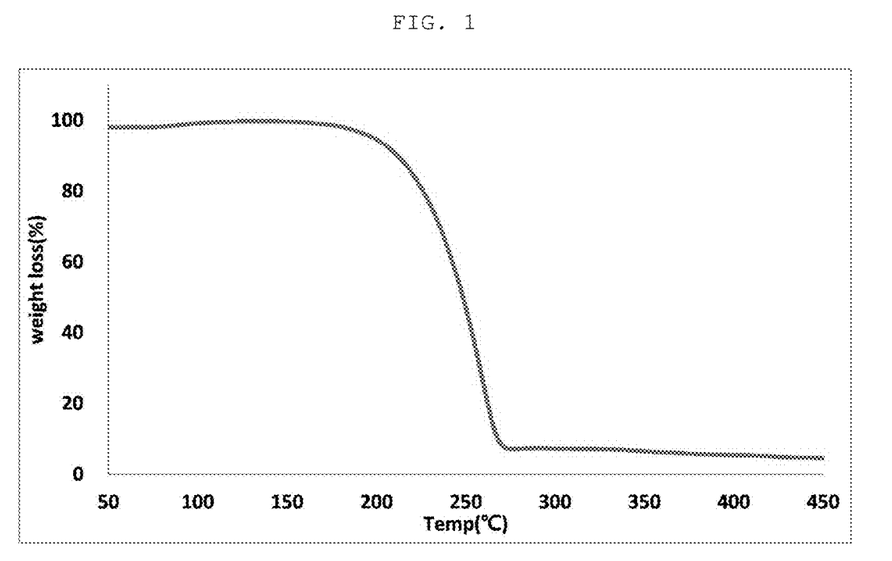
FIG. 1 is a drawing showing TG analysis results of Example 1 of the present disclosure.

FIG. 1 shows a TG graph of $(C_5H_4(CH_2CH_2N(CH_3)_2))In(CH_3)_2$ produced in Example 1 and it was found therefrom that the indium compound produced in Example 1 had a single evaporation step at about 200° C., and the residue mass at 500° C. was confirmed as 4.2% and it was found therefrom that the thermal stability of the indium compound of the present disclosure was excellent.

Figure 2:
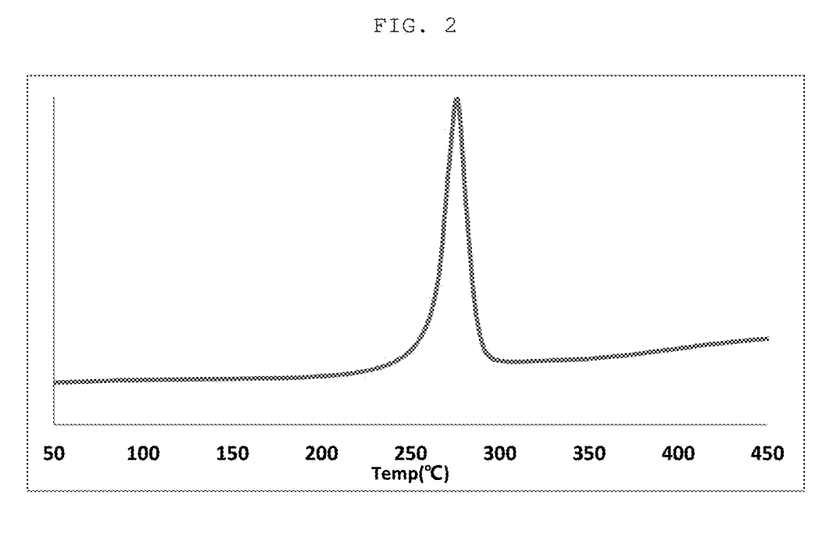
FIG. 2 is a drawing showing DSC analysis results of Example 1 of the present disclosure.

In addition, FIG. 2 shows DSC analysis results, in which an endothermic peak was confirmed at 260° C., and it was found therefrom that effective vaporization was shown.

[Example 2] Production of $(C_5H_4(CH_2CH_2O(CH_3)))In(CH_3)_2$ n-Butyllithium (59 ml, 2.3 M solution in n-hexane, 0.14 mol) was added to a 1 L 2-neck flask including a magnetic stirrer and a condenser, 200 mL of n-hexane was added, and then stirring was performed.

(2-Methoxyethyl)cyclopentadiene was slowly added while the internal temperature of the mixture was maintained at 0° C., and stirring was performed at room temperature for 2 hours to synthesize Li (2-methoxyethyl)cyclopentadiene.

$InCl_3$ (30 g, 0.14 mol) was added to a 2 L 2-neck flask including a magnetic stirrer and a condenser, 200 ml of n-hexane was added thereto, and stirring was performed while the internal temperature was maintained at 0° C. Prepared Li (2-methoxyethyl)cyclopentadiene was slowly added to the flask, and stirring was performed at room temperature for 2 hours to synthesize $(C_5H_4(CH_2CH_2O(CH_3))In(C_1)_2$. MeMgCl (90 ml, 3.0 M solution in THF, 0.27 mol) was slowly added to the flask while the internal temperature was maintained at 10° C., and then production of light gray precipitate was confirmed. The synthesized mixture was filtered with a filtration device, the solvent was removed under reduced pressure, and 20.5 g (76% from $InCl_3$) of a light yellow liquid was obtained.

$^1$H NMR (400 MHz, $C_6D6$) δ6.5, 5.7, 3.0(m, 4H, Cp), 2.9(t, 2H), 2.7(s, 3H), 2.6(t, 2H), −0.3(s, 6H)

Figure 3:
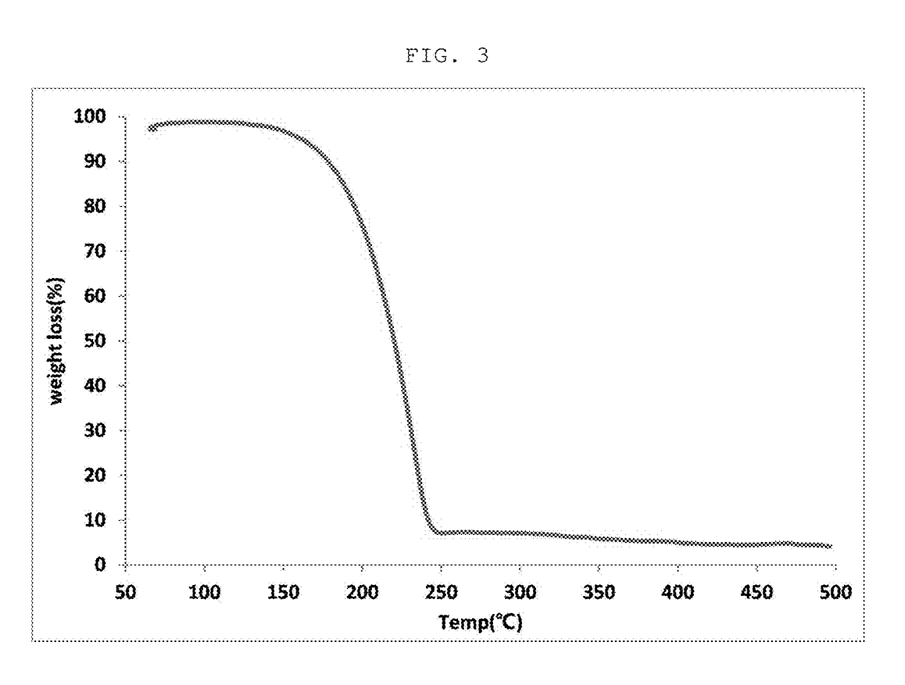
FIG. 3 is a drawing showing TG analysis results of Example 2 of the present disclosure.

FIG. 3 shows a TG graph of $(C_5H_4(CH_2CH_2O(CH_3)))In(CH_3)_2$ produced in Example 2 and it was found therefrom that the indium compound produced in Example 2 had a single evaporation step at 190° C., and the residue mass at 500° C. was confirmed as 4% and it was found therefrom that the thermal stability of the indium compound of the present disclosure was excellent.

Figure 4:
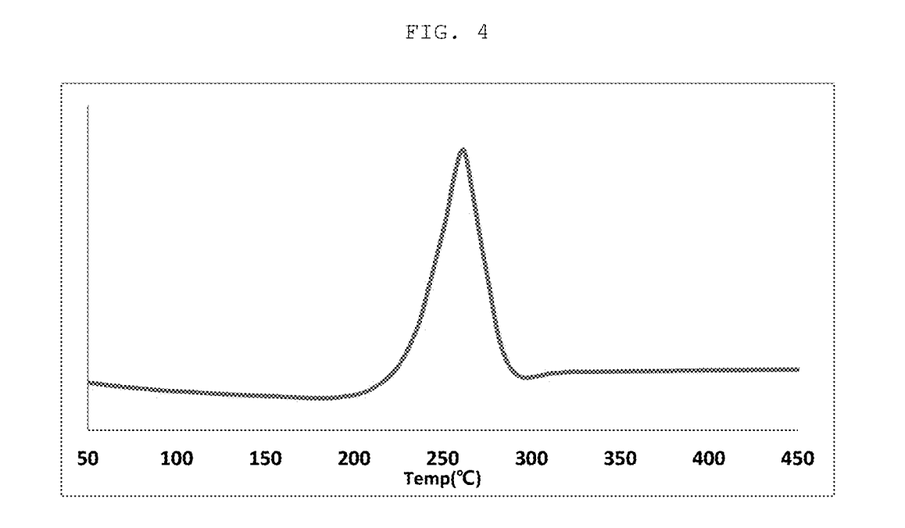
FIG. 4 is a drawing showing DSC analysis results of Example 2 of the present disclosure.

In addition, FIG. 4 shows DSC analysis results, in which an endothermic peak was confirmed at 230° C., and it was found therefrom that effective vaporization was shown.

[Example 3] Production of Indium-Containing Thin Film Using $(C_5H_4 (CH_2CH_2N(CH_3) 2))In(CH_3) 2$ An indium-containing thin film was produced by atomic layer deposition (ALD) using the indium compound according to Example 1 and ozone ($O_3$) as a reaction gas.

A silicon substrate was loaded inside a deposition chamber, and the substrate temperature was adjusted to 350° C. $(C_5H_4(CH_2CH_2N(CH_3)_2))In(CH_3)_2$ produced in Example 1 present in the stainless steel foam container was filled as an organometallic precursor, and the temperature was adjusted to 100° C.

The organic metal precursor was injected into the deposition chamber for 3 seconds using a nitrogen gas as a transport gas (100 sccm). Purging was performed for 5 seconds using a nitrogen gas (500 sccm) to remove the organic metal precursor and reaction by-products remaining in the deposition chamber.

Ozone was injected for 5 seconds as a reaction gas to deposit an indium-containing oxide thin film. Thereafter, purging was performed for 5 seconds using a nitrogen gas (500 sccm) to remove remaining reaction gas and reaction by-products.

1000 cycles were performed with the processes described above as one cycle to produce an indium-containing oxide thin film. As a result of an XPS analysis for the indium-containing thin film, an indium content and an oxygen (O) content were measured as 38.2% and 58.1%, respectively, and it was confirmed that an indium oxide film was substantially formed.

[Example 4] Production of Indium-Containing Thin Film Using $(C_5H_4(CH_2CH_2O(CH_3))) In(CH_3) 2$ An indium-containing thin film was produced by atomic layer deposition (ALD) using the indium compound according to Example 1 and ozone ($O_3$) as a reaction gas.

A silicon substrate on which silicon oxide was grown was loaded inside a deposition chamber, and the substrate temperature was adjusted to 350° C. (C$_5$H$_4$ (CH$_2$CH$_2$O(CH$_3$))) In(CH$_3$)$_2$ produced in Example 1 present in the stainless steel foam container was filled as an organometallic precursor, and the temperature was adjusted to 100° C.

The organic metal precursor was injected into the deposition chamber for 3 seconds using a nitrogen gas as a transport gas (100 sccm). Purging was performed for 5 seconds using a nitrogen gas (500 sccm) to remove the organic metal precursor and reaction by-products remaining in the deposition chamber.

Ozone was injected for 3 seconds as a reaction gas to deposit an indium-containing oxide thin film. Thereafter, purging was performed for 5 seconds using a nitrogen gas (500 sccm) to remove remaining reaction gas and reaction by-products.

1000 cycles were repeated with the processes described above as one cycle to produce an indium-containing oxide thin film. As a result of an XPS analysis for the indium-containing thin film, an indium content and an oxygen content were measured as 38.5% and 59.1%, respectively, and it was confirmed that an indium oxide film was substantially formed.

Thus, the indium compound according to an embodiment of the present disclosure has more improved thermal stability, high volatility, and improved vapor pressure, and thus, when a thin film is produced using the compound, a thin film showing a uniform and stable deposition speed to have high reliability may be formed, a uniform film thickness for a three-dimensional device may be provided, and a thin film showing an excellent composition ratio between indium and oxygen may be produced.

The indium compound according to an embodiment of the present disclosure has more improved thermal stability, high volatility, and improved vapor pressure, thereby forming a thin film which shows a stable deposition speed to have excellent reliability.

The method of producing an indium compound according to an embodiment of the present disclosure may industrially easily produce a high-purity indium compound in a high yield by a simple process.

The method of producing an indium-containing thin film according to an embodiment of the present disclosure uses the indium compound of the present disclosure or a composition for depositing an indium-containing thin film including the same, thereby having high film uniformity and good doping controllability by using atomic layer deposition and the like. Furthermore, the production method may provide a conformal step coverage for a three-dimensional semiconductor device.

The indium-containing thin film according to an embodiment of the present disclosure contains 35% or more indium, thereby having excellent physical properties.

Hereinabove, although the present disclosure has been described by specific matters, the examples, and the comparative examples, they have been provided only for assisting in the entire understanding of the present disclosure. Therefore, the present disclosure is not limited to the above Examples. Various modifications and changes may be made by those skilled in the art to which the present disclosure pertains from this description.

Therefore, the spirit of the present disclosure should not be limited to the above-described embodiments, and the following claims as well as all modified equally or equivalently to the claims are intended to fall within the scope and spirit of the disclosure.

What is claimed is:

1. An indium compound represented by the following Chemical Formula 1:

[Chemical Formula 1]

wherein
L is C$_1$-C$_6$ alkylene;
R$_1$ to R$_4$ are independently of one another hydrogen or C1-C10 alkyl;
R$_5$ and R$_6$ are independently of each other C1-C10 alkyl;
Y is —NR$_{11}$R$_{12}$, —OR$_{13}$, or —SR$_{14}$; and
R$_{11}$ to R$_{14}$ are independently of one another hydrogen, C1-C10 alkyl, or haloC1-C10 alkyl, or R$_{11}$ and R$_{12}$ are linked to form a ring.

2. The indium compound of claim 1, wherein in Chemical Formula 1,
R$_1$ to R$_4$ are independently of one another hydrogen or C1-C6 alkyl;
R$_5$ and R$_6$ are independently of each other C1-C6 alkyl;
Y is —NR$_{11}$R$_{12}$, —OR$_{13}$, or —SR$_{14}$; and
R$_{11}$ to R$_{14}$ are independently of one another hydrogen or C1-C6 alkyl, or R$_{11}$ and R$_{12}$ are linked to form an alicyclic ring.

3. The indium compound of claim 1, wherein the indium compound is represented by the following Chemical Formula 2:

[Chemical Formula 2]

wherein
R$_1$ to R$_4$ are independently of one another hydrogen or C1-C6 alkyl;
R$_5$ and R$_6$ are independently of each other C1-C6 alkyl;
Y is —NR$_{11}$R$_{12}$, —OR$_{13}$, or —SR$_{14}$;
R$_{11}$ to R$_{14}$ are independently of one another hydrogen or C1-C6 alkyl, or R$_{11}$ and R$_{12}$ are linked to form an alicyclic ring; and
m is an integer of 1 to 3.

4. The indium compound of claim 1, wherein the indium compound is selected from the following compounds:

-continued

5. A composition for depositing an indium-containing thin film comprising an indium compound represented by the following Chemical Formula 1:

[Chemical Formula 1]

wherein

L is $C_1$-$C_6$ alkylene;

$R_1$ to $R_4$ are independently of one another hydrogen or C1-C10 alkyl;

$R_5$ and $R_6$ are independently of each other C1-C10 alkyl;

Y is —$NR_{11}R_{12}$, —$OR_{13}$, or —$SR_{14}$; and $R_{11}$ to $R_{14}$ are independently of one another hydrogen, C1-C10 alkyl, or haloC1-C10 alkyl, or $R_{11}$ and $R_{12}$ are linked to form a ring.

6. The composition for depositing an indium-containing thin film of claim 5, wherein in Chemical Formula 1,

$R_1$ to $R_4$ are independently of one another hydrogen or C1-C6 alkyl;

$R_5$ and $R_6$ are independently of each other C1-C6 alkyl;

Y is —$NR_{11}R_{12}$, —$OR_{13}$, or —$SR_{14}$; and $R_{11}$ to $R_{14}$ are independently of one another hydrogen or C1-C6 alkyl, or $R_{11}$ and $R_{12}$ are linked to form an alicyclic ring.

7. The composition for depositing an indium-containing thin film of claim 5, wherein the indium compound is represented by the following Chemical Formula 2:

[Chemical Formula 2]

wherein $R_1$ to $R_4$ are independently of one another hydrogen or C1-C6 alkyl;

$R_5$ and $R_6$ are independently of each other C1-C6 alkyl;

Y is —$NR_{11}R_{12}$, —$OR_{13}$, or —$SR_{14}$;

$R_{11}$ to $R_{14}$ are independently of one another hydrogen or C1-C6 alkyl, or $R_{11}$ and $R_{12}$ are linked to form an alicyclic ring; and m is an integer of 1 to 3.

8. The composition for depositing an indium-containing thin film of claim 5, wherein the indium compound is selected from the following compounds:

-continued

9. A method of producing an indium-containing thin film, the method comprising: using the indium compound of claim 1 to produce the thin film.

10. A method of producing an indium-containing thin film, the method comprising: using the composition for depositing an indium-containing thin film of claim 5 to produce the thin film.

11. The method of producing an indium-containing thin film of claim 10, wherein the method includes:

a) heating a substrate mounted in a chamber; and b) injecting a reaction gas and the composition for depositing an indium-containing thin film into the chamber to produce the indium-containing thin film.

12. The method of producing an indium-containing thin film of claim 11, wherein the reaction gas is any one or two or more selected from oxygen ($O_2$), ozone ($O_3$), vapor ($H_2O$), hydrogen peroxide ($H_2O_2$), nitrogen monoxide (NO), nitrous oxide ($N_2O$), nitrogen dioxide ($NO_2$), ammonia ($NH_3$), nitrogen ($N_2$), hydrazine ($N_2H_4$), amine, diamine, carbon monoxide (CO), carbon dioxide ($CO_2$), $C_1$ to $C_{12}$ saturated or unsaturated hydrocarbon, hydrogen ($H_2$), argon (Ar), silane, and helium (He).

* * * * *